Feb. 18, 1930. A. W. BAUMGARTEN ET AL 1,747,924
TROLLEY COLLECTOR
Original Filed April 29, 1927
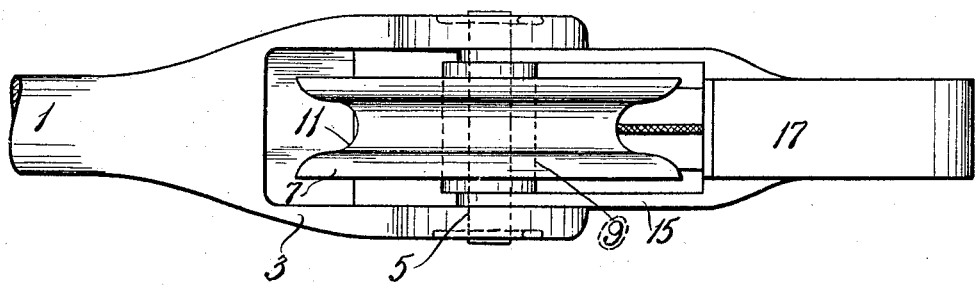
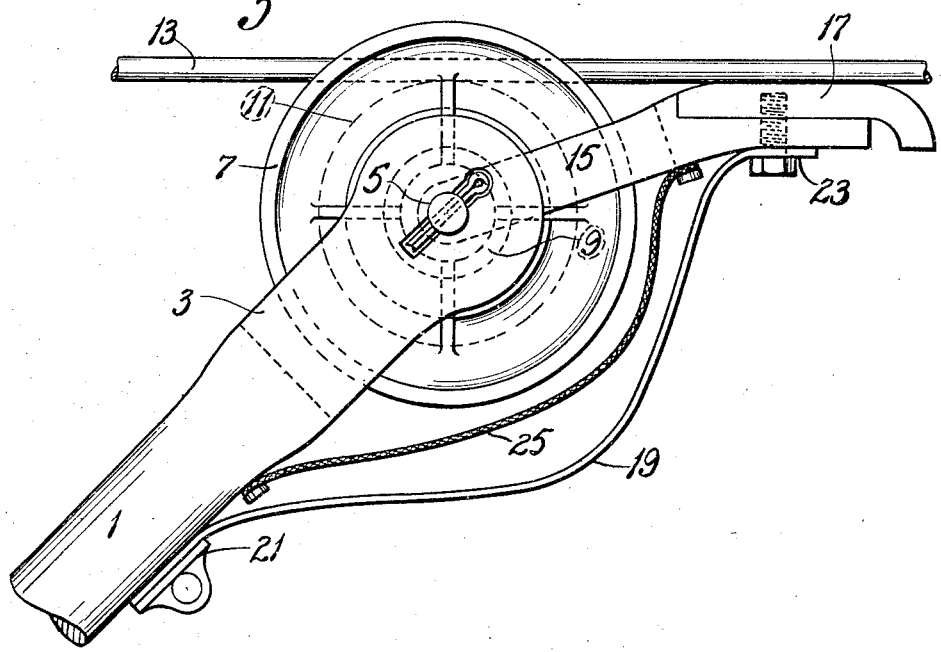

Patented Feb. 18, 1930

1,747,924

UNITED STATES PATENT OFFICE

ARTHUR WILLIAM BAUMGARTEN, OF JOLIET TOWNSHIP, WILL COUNTY, AND LOUIS AUGUST BISCHMAN, OF JOLIET, ILLINOIS, ASSIGNORS TO JOHN ROBERT BLACKHALL, OF JOLIET, ILLINOIS

TROLLEY COLLECTOR

Application filed April 29, 1927, Serial No. 187,422. Renewed March 18, 1929.

This invention relates to trolley collectors and with regard to certain more specific features, to a collector comprising the combination of a trolley wheel and a trolley shoe.

Among the several objects of the invention may be noted the provision of means for obtaining increased electrical contacting area at lower pressures without arcing; the provision of a low pressure contactor which is positively guided in its movement along the trolley and which will positively remain in contact with the trolley wire, even though the trolley wheel leaves the wire at hangers when traveling at high speeds; the provision of apparatus of the class described which is adapted to reduce wear; the provision of a collector having renewable contactor elements and the provision of a device of the class described which may be economically manufactured, and which has a low cost of upkeep. Other objects will be in part obvious and in part pointed out hereinafter.

The invention accordingly comprises the elements and combinations of elements, features of construction, and arrangements of parts which will be examplified in the structure hereinafter described, and the scope of the application of which will be indicated in the following claims.

In the accompanying drawings, in which is illustrated one of various possible embodiments of the invention, Fig. 1 is a plan view of the collector; and Fig. 2 is a side elevation thereof, showing a trolley wire.

Corresponding reference characters indicate corresponding parts throughout the several views of the drawings.

Referring now more particularly to the drawings, there is illustrated at numeral 1 a trolley pole surmounted by a harp 3. The harp 3 carries a pin 5, upon which is rotatably mounted a trolley wheel 7. The wheel 7 is preferably mounted on the pin 5 by means of a roller or other similar anti-friction bearing 9, it being possible to use this refined type of bearing in view of the invention described herein. The trolley wheel 7 is grooved at 11 to engage and track upon the trolley wire 13.

Pivoted on the pin 5 is an oscillable clevis 15 which reaches rearwardly of the wheel 7, said clevis being composed of copper, bronze or other conducting metal. This clevis 15 is provided with a detachable shoe 17 composed preferably of a non-wearing conducting metal and having a substantial bearing area on the trolley wire, directly behind the trolley wheel. The geometric relationship between the surface of the detachable shoe 17 and the bottom of the groove 11 is tangential, so that the shoe has contact with the wire along its whole predetermined length, regardless of the angle which the trolley pole 1 has with respect to the wire 13. This relationship is a constant one, because the clevis 15 is pinned around the center about which the wheel 7 rotates.

In order at all times to maintain contact between the detachable shoe 17 and the trolley wire 13, there is provided a spring 19 reacting from a juncture 21 at one end with the trolley pole 1 to its juncture 23 at its other end with said clevis 15. Under normal running conditions, the spring 19 is deformed an amount adapted to give about three or four pounds pressure between the shoe and the trolley wire. This pressure is considerably less than the pressure between the wheel 7 and said trolley wire, the wheel pressure being due to the conventional trolley stand spring which holds up the trolley pole. The trolley stand and spring are not shown in the present drawings, these parts being located near the car roof. The pressure between the wheel and the wire in the present embodiment is equal to that in the conventional trolley construction, namely, about thirty-five pounds.

A copper conducting wire 25 may be used between the clevis 15 and the pole 1 in order to transmit the greater part of the current flow.

By the use of this invention, it is possible to retain all of the advantages of a trolley wheel for following trolley wires, combining therewith all of the advantages of a low-pressure sliding contact for collecting current.

Heretofore, a trolley wheel was used, or a shoe. The wheel had small contact with high speeds and was therefore burned and pitted. Furthermore, it was made of soft, conducting material and wore fast. By means of the present invention the wheel is relieved of its conducting function and may therefore be made of hard steel, thus reducing wear. Also, by being relieved of the conducting function, the pitting is reduced. Pitting occurred when the wheel intermittently left the trolley wire at high speeds.

In the constructions which used a shoe only, the wear was excessive because of the high friction, due to high contact pressure required for maintaining the shoe on the wire.

In the present invention, the wheel (which is loaded with thirty-five pounds or so of pressure for maintaining mechanical contact) may be manufactured with only wear-resisting requirements in view. The improved wear-resisting roller bearing 9 may be used, which ordinarily would not carry a large current. No burning is had and thus the contour of the wheel is preserved. The wheel acts as a guide only.

On the other hand the light contact pressure of the shoe reduces wear and yet provides for ample current transmission at the increased contacting area. The current is better transmitted than if it were only transmitted through the wheel, because the wheel has only a small contact area.

It is evident from the geometric construction, that the shoe maintains its original longitudinal contact regardless of the angular relationship between the pole 1 and the trolley 13. The shoe maintains contact with the wire when the wheel jumps from the trolley in passing hangers at high speeds.

As illustrated in the side elevations, the shoe 17 is bent downwardly at the rear thereof, thereby making it possible to readily back a car.

It is to be understood that the wheel may be entirely insulated from the trolley pole 1, if desired.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. The trolley collector comprising a pole having a harp thereon, a pin between the legs of the harp rotatably carrying a trolley wheel thereon, a rearwardly extending clevis oscillably mounted on said pin with its legs between the wheel and the legs of the harp, a contacting shoe supported by said clevis, a leaf spring reacting between the pole and the clevis adapted to press the shoe against the trolley wire, said leaf spring being mounted in the plane of the wheel and below the same, and flexible means for carrying at least some of the current from the shoe to the pole without said current passing through said pin, said flexible means being also located within the plane of and below said wheel and above said spring, whereby it is in a protected position.

2. The trolley collector comprising a pole having a harp thereon, a pin between the legs of the harp rotatably carrying a trolley wheel thereon, a rearwardly extending clevis oscillably mounted on said pin with its legs between the wheel and the legs of the harp, a contacting shoe supported by said clevis, a spring reacting between the pole and the clevis adapted to press the shoe against the trolley wire, said spring being mounted within the plane of the sides of the clevis, and flexible means for carrying at least some of the current from the shoe to the pole without said current passing through said pin, said flexible means being located within the plane of and below said wheel whereby it is in a protected position.

3. The trolley collector comprising a pole having a harp thereon, a pin between the legs of the harp rotatably carrying a trolley wheel thereon, a rearwardly extending clevis oscillably mounted on said pin with its legs between the wheel and the legs of the harp, a contacting shoe supported by said clevis, a spring reacting between the pole and the clevis adapted to press the shoe against the trolley wire, said spring being mounted within the plane of the sides of the clevis.

In testimony whereof, we have signed our names to this specification this 25th day of April, 1927.

ARTHUR WILLIAM BAUMGARTEN.
LOUIS AUGUST BISCHMAN.